United States Patent

[11] 3,590,926

| [72] | Inventor | Frank J. Tepera |
| | | 1183, Curtin, Tex. 77018 |
| [21] | Appl. No. | 753,465 |
| [22] | Filed | Aug. 19, 1968 |
| [45] | Patented | July 6, 1971 |

[54] CUTTING BLADE ASSEMBLY FOR LAWN EDGERS
6 Claims, 4 Drawing Figs.

[52] U.S. Cl. .................................................. 172/15, 56/295, 172/91, 172/545
[51] Int. Cl. .................................................. A01b 45/04
[50] Field of Search .......................................... 172/15, 91, 96, 545; 56/295

[56] References Cited
UNITED STATES PATENTS

| 1,893,871 | 1/1933 | Romera | 172/91 |
| 2,325,997 | 8/1943 | Kelly et al. | 172/545 |
| 2,667,022 | 1/1954 | Richey | 172/96 X |
| 2,669,819 | 2/1954 | Sawyer | 172/96 X |
| 2,707,859 | 5/1955 | Walker | 172/15 UX |
| 3,246,704 | 4/1966 | Honda et al. | 172/96 |

FOREIGN PATENTS

| 340,362 | 2/1904 | France | 172/91 |

Primary Examiner—Robert E. Pulfrey
Assistant Examiner—C. Coughenour
Attorney—Carlos A. Torres ABSTRACT: Cutting blades are pivotably secured to a series of staggered, radially projecting arms extending from a tubular body. A centrally apertured plate is secured to one axial end of the body to receive an adapter bushing for mounting the body on different size, rotatable lawn edger shafts. Rotation of the edger shaft extends the blades by centrifugal force to cut a relatively wide path between a lawn and a boundary such as a sidewalk.

PATENTED JUL 6 1971 3,590,926
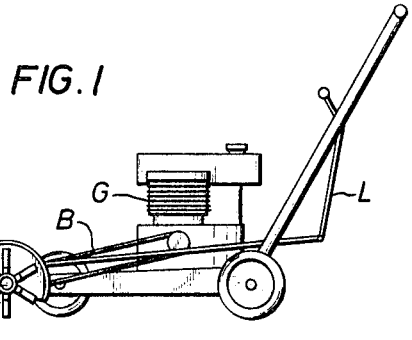
FIG.1
FIG.2
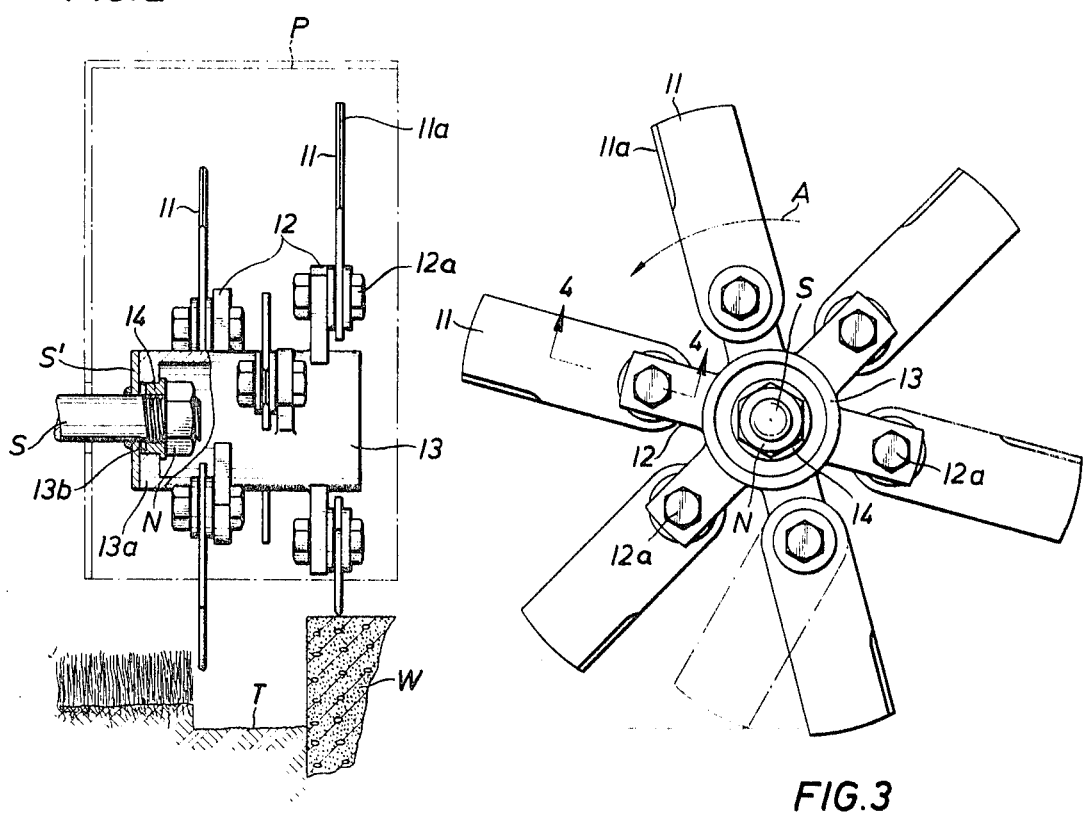
FIG.3
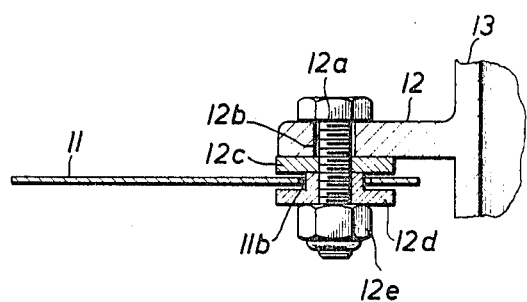
FIG.4
Frank J. Tepera
INVENTOR.
BY Carlos A. Torres
ATTORNEY

CUTTING BLADE ASSEMBLY FOR LAWN EDGERS

BACKGROUND OF THE INVENTION

1. Field of the Invention

The present invention relates generally to power equipment for cutting and edging lawns. More particularly, the present invention relates to a cutting assembly which may be attached to a typical power lawn edger for cutting and removing grass in a relatively wide path along the lawn's boundaries.

2. Description of the Prior Art

One of the common lawn edgers currently employed includes a single blade which is centrally mounted on a rotating shaft which is driven by a small gasoline or electric motor. The edger is employed to cut a narrow strip of grass between a sidewalk, fence or other lawn boundary. While the edger is satisfactory for some purposes, it often requires several passes over the same area to obtain the desired amount of lawn removal. In other applications where the lawn boundary is a solid structure such as a sidewalk, the rigid, single blade employed with the typical edger may be quickly destroyed or damaged if it strikes the structure. For this reason, care must be exercised when edging along such obstructions resulting in a corresponding increase in the time required to complete the job.

One prior art lawn edger described in U. S. Pat. No. 2,791,077 to Lyle employs a cutter element consisting of a series of pivotable lengths or wire. The cutter elements are secured to the rotatable shaft of the edger and are extended radially outwardly by centrifugal force when the shaft is rotated. The described assembly eliminates some of the dangers associated with edging along sidewalks and the like, however, the wire lengths are unsatisfactory cutting elements for completely removing the grass and in fact are expressly designed to cut the grass without disturbing the underlying sod. Moreover, the wire elements are slidably mounted axially to produce a narrow cutting path.

In many applications, it may be desirable to form a relatively wide path along the lawn boundary with complete removal of the grass and sod in the pathway. This is particularly true in areas where the grass is thick and grows quickly. Where such a path is desired, it is necessary to make several passes over the same area with the described prior art edgers.

Still another problem frequently associated with prior art edger machines is the absence of interchangeability of blades between the various types and models of edgers made by different manufacturers. Even though the majority of edgers employ a simple rotating shaft for driving the cutting blade, the blade itself must include a mounting aperture which corresponds with the mounting means on the edger shaft or it may not be employed.

SUMMARY OF THE INVENTION

A series of flat cutting blades are pivotally mounted on staggered, radially projecting arms which extend from a tubular mounting body. One axial end of the mounting body is provided with a centrally apertured end plate with the aperture being adapted to receive an adapter bushing having a central opening which matches the dimensions of the rotatable edger shaft. By this means, the mounting body may be secured to a great variety of shaft sizes and types by simply selecting the appropriate adapter bushing.

The blades are staggered and their position is fixed axially along the mounting body to insure complete cutting of a relatively wide path through the grass. By pivotally mounting the blades, blade damage and severe shaking or kicking of the edger are prevented when the blades strike a solid nonyielding obstruction such as a concrete sidewalk. The fixed axial positioning of the blades in cooperation with their pivotal mounting thereby permits cutting of a relatively wide path immediately adjacent a sidewalk or the like even as the blades along a portion of the body are striking the walk.

The blades are also removably mounted on the radially projecting arms for replacement or repair as well as to permit both proper positioning of the blades cutting edge with respect to the direction of rotation of the edger shaft and blade removal for reducing the width of the cutting path.

BRIEF DESCRIPTION OF THE DRAWINGS

FIG. 1 is an elevation illustrating a conventional power lawn edger equipped with the blade assembly of the present invention;

FIG. 2 is a side view partly in section illustrating the blade assembly of the present invention;

FIG. 3 is an end view of the blade assembly of the present invention; and

FIG. 4 is a partial cross section taken along the line 4—4 of FIG. 3 illustrating certain details in the mounting of a single blade in the blade assembly of the present invention.

DESCRIPTION OF THE PREFERRED EMBODIMENT

FIG. 1 illustrates a gasoline engine powered rotary lawn edger E equipped with the cutting blade assembly of the present invention indicated generally at 10. The edger E is conventional and includes an endless belt B which conveys the rotational motion of a gasoline engine G to a rotatable drive shaft S, a protective guard P and a mechanical linkage L for raising and lowering the assembly 10.

As best illustrated in FIGS. 2, 3 and 4, the assembly 10 includes a plurality of blades 11 having cutting edges 11a mounted on radially projecting arms 12 extending from a tubular mounting body 13. The arms 12 and attached blades 11 are disposed at circumferentially and axially spaced positions about the mounting body 13. The illustrated axial positioning of the blades 11 insures complete removal of the grass along the entire cutting path while the circumferential spacing provides maximum cutting effectiveness for each blade.

With reference to FIG. 4, the blades 11 are pivotally mounted on the arms 12 by means of a bolt 12a which extends through bore 12b formed in the arm 12. Washers 12c and mounting bushings 12d are tightly secured over the bolts 12a by locknuts 12e. The blades 11 are provided with bores 11b which are disposed over the bushings 12d to permit the blades to pivot about their mountings.

The illustrated mounting of the blades 11 permits the blades to be removed and replaced or repaired. It also permits the cutting edge 11a of the blade 11 to be properly mounted with respect to the direction of rotation of the drive shaft S. Thus, with rotation in the direction of the arrow A in FIG. 3, the cutting edge 11a should be disposed as illustrated. If rotation is in the opposite direction, the blades 11 may simply be removed from their mountings, reversed, and reassembled. Still another advantage of the illustrated mounting is that some of the blades may be removed to produce a narrower cutting path. Thus, if a very narrow path were desired, only the two blades closest to the open end of the body 13 might be employed. If a slightly wider path were desired, four blades might be employed.

As best illustrated in FIG. 2, the blade assembly 10 is mounted on the drive shaft S of the edger E by means of an adapter bushing 14 which extends through a central bore 13b formed in an endplate 13a on the body 13. The endplate 13a is tightly held to a backing plate S' on the shaft S by means of a nut N threadedly engaged over the shaft S. The adapter bushing 14 extends only partially through the bore 13b to provide a firm frictional engagement between the backing plate S' and the endplate 13a which prevents slippage under normal conditions. The friction mounting of the body 11 on the drive shaft S provides a safety feature as compared with rigid mountings in that it prevents damage to the blade assembly by permitting some slippage when a solid obstruction is hit by all of the blades.

In the operation of the blade assembly 10, the individual blades 11 are extended outwardly by centrifugal force as the shaft S is rotated and, as illustrated in FIG. 2, the cutting edges 11a of the blades 11 are driven against the grass and sod to cut a trench T. If some of the blades strike a solid obstruction such as a sidewalk W, they pivot about their mountings and the remaining blades continue to cut thus ensuring complete removal of the grass along the edge of the walk. By this means, damage to the blades 11 is prevented and no harsh jarring forces are transmitted to the edger E.

The foregoing disclosure and description of the invention is illustrative and explanatory thereof, and various changes in the size, shape, and materials as well as in the details of the illustrated construction may be made within the scope of the appended claims without departing from the spirit of the invention.

I claim:

1. A cutter blade assembly for edging lawns comprising:
   a. an axially extending body means;
   b. a plurality of cutting means;
   c. a plurality of axially spaced first mounting means secured to said body means for circumferentially staggering and pivotably carrying said cutting means;
   d. a second mounting means secured to said body means for mounting said cutter blade assembly on the rotatable drive shaft of a power lawn edger;
   e. a tubular member included in said body means;
   f. said first mounting means including securing means extending radially outwardly from said tubular member; and
   g. said second mounting means including a centrally apertured plate secured to one axial end of said tubular member with the other axial end of said tubular member being open to permit access to said plate through said tubular member.

2. The cutter blade assembly as defined in claim 1 wherein said second mounting means includes an adapter bushing for securing said tubular member to a drive shaft from a power edger.

3. The cutter blade assembly as defined in claim 2 wherein said first mounting means include removable means for securing said blades to said first mounting means.

4. The cutter blade assembly as defined in claim 3 wherein said removable means are secured to said securing means and include a bolt, a nut, and a bushing.

5. The cutter blade assembly as defined in claim 1 wherein said first axially spaced mounting means include arm means staggered along said body means.

6. The cutter blade assembly as defined in claim 1 wherein said cutting means include elongated, flat blades having cutting surfaces formed along their edges.